United States Patent [19]

Carroll

[11] 4,403,269

[45] Sep. 6, 1983

[54] NON-DISSIPATIVE SNUBBER CIRCUIT APPARATUS

[75] Inventor: Lawrence B. Carroll, Endwell, N.Y.

[73] Assignee: International Business Machines Corporation, Armonk, N.Y.

[21] Appl. No.: 354,984

[22] Filed: Mar. 5, 1982

[51] Int. Cl.³ .............................................. H02H 7/20
[52] U.S. Cl. ...................................... 361/91; 307/253; 307/542; 363/132; 363/16; 363/56; 361/88
[58] Field of Search ............................. 361/91, 88, 56; 363/127, 131, 132, 133, 134, 136, 16, 17, 50, 52, 53, 55, 56; 330/298, 207 P; 307/253, 540, 542, 543, 546, 547, 565

[56] References Cited

U.S. PATENT DOCUMENTS 4,333,134  6/1982  Gurwicz ...................... 363/132 X
4,363,067 12/1982  Radomski ..................... 307/253 X
4,365,171 12/1982  Archer ......................... 361/91 X

OTHER PUBLICATIONS

"Designing Non-Dissipative Current Snubbers for Switched Mode Converters", Proc. of POWERCON R 6, May 2–4, 1979, First Printing Apr. 1979 (Pre-Conference Edition), pp. B1-1 to B1-6.
"Base Drive Considerations in High Power Switching Transistors", D. Roark, TRW R Power Semiconductors Application Note, No. 120 (1/75), pp. 1 to 11.
"Schottky Rectifiers Shine in Low-Voltage Switchers", R. Patch, Electronic Design, Dec. 10, 1981, pp. 149 to 154.

Primary Examiner—Patrick R. Salce
Attorney, Agent, or Firm—Norman R. Bardales

[57] ABSTRACT

A dual-switch transformer-coupled switching regulator is provided with a non-dissipative snubber circuit arrangement wherein the resonant elements thereof include an inductor serially connected between two capacitors through a diode switch. The snubber has two other diode switches that are connected on mutually exclusive ones of the same sides of the capacitors that are connected to the inductor. Each of the last two mentioned diode switches connects the respective aforementioned side of the particular capacitor to the outer main terminal of a mutually exclusive one of the dual transistor switches of the regulator. The other side of the particular capacitor is connected to the other main terminal of the other one of the dual transistor switches. The arrangement minimizes any deleterious effects caused when the dual switches are being switched.

10 Claims, 4 Drawing Figures

NON-DISSIPATIVE SNUBBER CIRCUIT APPARATUS

BACKGROUND OF THE INVENTION

1. Field of the Invention

This invention is related to non-dissipative snubber circuit apparatus and more particular to non-dissipative snubber circuit apparatus for dual-switch transformer-coupled switching regulators.

2. Description of the Prior Art

Protection of transistor power switches in switching regulators by a current snubber circuit is well known in the art; see, for example, "Designing Non-Dissipative Current Snubbers For Switched Mode Converters", E. C. Whitcomb, Proceedings of POWERCON ® 6, May 2-4, 1979, 1st Printing April 1979 (pre-conference edition), pp B1-1 to B1-6; "Base Drive Considerations in High Power Switching Transistors", D. Roark, TRW ® Power Semiconductors Application Note, No. 120(1/75), pp 1 to 11; and "Schottky Rectifiers Shine in Low-Voltage Switchers", R. Patel, Electronic Design, Dec. 10, 1981, pp 149 to 154.

More particularly, snubber circuits, or snubbers as they are sometimes simply referred to in the art, have found general acceptance in protecting switching regulators that use only a single transistor power switch, or a pair of transistor power switches that operate in a push pull mode, i.e. alternately or out of phase. These include snubbers of both the well known dissipative and non-dissipative types.

However, heretofore, in the prior art of which I am aware, for dual-switch transformer-coupled switching regulators wherein two in phase transistor switches are in series coupled relationship with the switching transformer, only dissipative snubber types have been used. Heretofore, a non-dissipative type has not been used with these last mentioned kind of switching regulators, herein sometimes referred to as a dual switch switching regulator, because in general of the circuit complexity required for implementation and the resultant problems associated with operating the two transistors in phase.

SUMMARY OF THE INVENTION

It is an object of this invention to provide non-dissipative snubber circuit apparatus that is readily implemented with dual switch transformer coupled switching regulators.

It is another object of this invention to provide non-dissipative snubber circuit apparatus of the aforementioned kind that is simple and reliable.

According to one aspect of the present invention, in dual-switch transformer-coupled switching regulator circuit apparatus, there is provided in combination therewith snubber circuit apparatus. The regulator circuit apparatus has a pair of first and second semiconductor switch means operable in phase, and transformer means. The input winding of the transformer means is coupled in series between the first and second switch means at predetermined first and second junctions, respectively. The series coupled pair of switch means and input winding are adapted for series connection between the positive and negative terminal means of a predetermined dc supply at predetermined third and fourth junctions, respectively. The regulator circuit apparatus further has third and fourth semiconductor switch means. The third switch means is coupled between the first junction and the fourth junction. The fourth switch means is coupled between the second junction and the third junction.

In the snubber circuit apparatus there is provided first and second capacitor means, and inductor means. Each of the capacitor means has a pair of first and second electrodes. The second electrode of the capacitor means is coupled to the first junction of the regulator apparatus, and the second electrode of the second capacitor means is coupled to the second junction. First diode means couples the inductor means between the first electrodes of the first and second capacitor means. Second diode means couples the first electrode of the first capacitor means to the fourth junction. Third diode means couples the first electrode of the second capacitor means to the third junction.

The foregoing and other objects, features and advantages of the invention will be apparent from the more particular description of the preferred embodiment of the invention, as illustrated in the accompanying drawing.

BRIEF DESCRIPTION OF THE DRAWING

In the Figures, like elements are designated with similar reference numbers.

DESCRIPTION OF THE PREFERRED EMBODIMENT

Figures 1, 3:
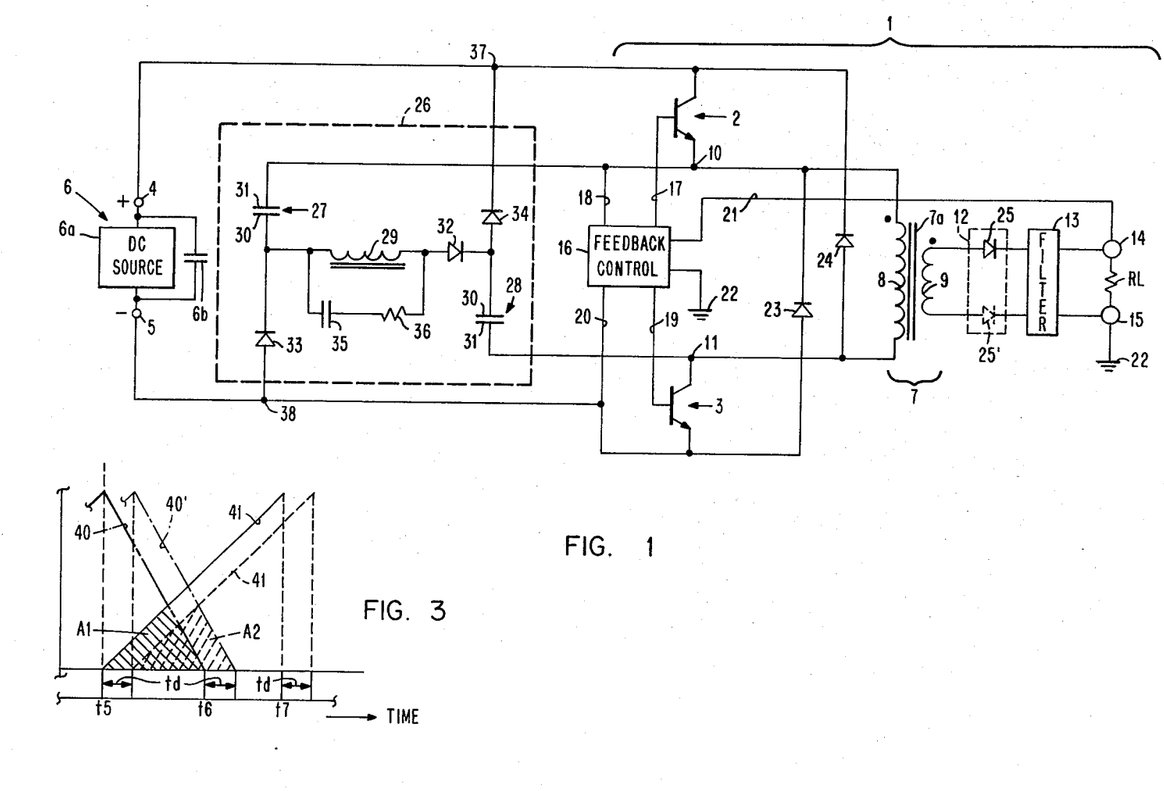
FIG. 1 is a schematic view of the preferred embodiment of the non-dissipative snubber circuit apparatus of the present invention in a known dual switch transformer coupled switching regulator partially shown in block form.
FIG. 3 is an idealized waveform timing diagram illustrating waveforms of the switching losses associated with the power switches of the apparatus of FIG. 1 under different conditions.

Referring now to FIG. 1, there is shown a dual-switch transformer-coupled switching regulator generally indicated by the reference numeral 1. In the preferred embodiment, the regulator 1 has dual semiconductor switch means, shown by way of example as substantially two identical NPN type transistor power switches 2 and 3 arranged in common emitter configurations. Preferably, the switches 2 and 3 have fast switching times. Switches 2 and 3 are in series coupled relationship with the hereinafter described switching transformer means.

The series coupled pair of dual switches 2 and 3 are adapted to be series coupled between the positive and negative terminals 4 and 5 of an unregulated dc supply 6 at the input terminals or junctions 37 and 38. Thus, in the preferred embodiment, the collector and emitter of transistor switches 2 and 3, respectively, are connected directly to the terminals 4 and 5, respectively. Supply 6 includes a source 6a of unregulated dc voltage Vb and an associated low impedance input filter capacitor 6b. Source 6a may be a battery or other appropriate dc source which directly provides voltage Vb, hereinafter sometimes referred to as the bulk voltage. Alternatively, source 6a may be an appropriate rectified ac source which provides bulk voltage Vb, for example, from an ac line supply.

The switching transformer means 7, herein sometimes referred to simply as the switching transformer, of the preferred embodiment has a magnetic core 7a and single-ended input and output windings 8 and 9, respectively. Input winding 8, and hence transformer 7, is serially coupled between the two switches 2 and 3 at the junctions 10 and 11, respectively. Thus, in the preferred embodiment of FIG. 1, winding 8 is serially connected between the emitter of transistor switch 2 and the collector of transistor switch 3. The output winding 9 is coupled via rectifier and filter circuits 12 and 13, respectively, to the output terminals 14 and 15, which in turn are connected across the load RL.

Preferably, switches 2 and 3 are opened and closed substantially in phase by a feedback control circuit 16 which provides a common control or driver signal to the control inputs of switches 2 and 3. Thus, in the preferred embodiment, the common control signal is provided at each of the paired outputs 17-18 and 19-20 of circuit 16 which are connected to the respective base-emitter inputs of switches 2 and 3, respectively. The input of circuit 16 is connected across the output terminals 14 and 15 via conductor 21 and common ground 22 and senses the regulated output voltage at the output 14-15. Such feedback control circuits, which are well known in the art, provide a pulse train control signal with predetermined switching frequency and on/off duty cycle characteristics commensurate with the regulation desired for the dc output at terminals 14 and 15 and can adjust at least one of the characteristics' parameters to compensate for any deviations in the level of the sensed output voltage from a predetermined reference level and thereby maintain the desired dc output. Such deviations may, for example, be due to changes in the load RL, and/or input Vb, etc. Demagnetizing diode switches 23 and 24 are connected between the emitters and between the collectors, respectively, of switches 2 and 3.

The switching regulator 1 is preferably configured for a forward operational mode in which case transformer 7 has the dot polarity indicated in solid form in FIG. 1 for the windings 8 and 9. Accordingly, the rectifier 12, illustrated schematically as diode 25, is appropriately poled as shown by its solid outline form in FIG. 1. Alternatively, the regulator 1 may be configured for a flyback operational mode by locating the diode 25 in the other leg of the winding 9 as shown by the dash outline form 25'. Depending on the particular operational mode, the filter 13 is modified accordingly. Thus, in the forward operational mode, filter 13 is an LC type with the choke inductor thereof being connected between diode 25 and terminal 14 and the capacitor being connected across terminals 14 and 15 in a manner well known to those skilled in the art. On the other hand, in the flyback operational mode, only a capacitor, which is connected across the terminals 14 and 15, is required as the winding 9 acts as the choke as is well known to those skilled in the art. In the forward operational mode, it should be understood that, as is customary, there is associated with the filter 13 an appropriately poled free wheeling diode, not shown, which is connected across the input of filter 13.

The basic principles of transformer coupled switching regulators and of their forward and flyback operational modes are well known to those familiar with the art. Briefly and with respect to the dual switch transformer coupled switching regulator 1 of FIG. 1, in the forward mode when switches 2 and 3 are closed, i.e. are on, energy is transferred from winding 8 to winding 9. More particularly, diode 25 is forward biased, the aforementioned free wheeling diode is reversed biased, and the current in winding 9 passes through the aforementioned choke winding of filter 13 and divides into the two parallel branches which are formed by the aforementioned capacitor of filter 13 and the load RL. In doing so, the current in the capacitor branch is used to recharge the filter capacitor to the desired regulated dc output voltage level, and the current in the load branch is used to supply the load at the desired regulated dc output voltage level. When switches 2 and 3 are opened, diode 25 is reversed biased, the free wheeling diode is forward biased, and the energy stored in the capacitor of filter 13 in coaction with the choke inductor of filter 13 and free wheeling diode is delivered through the load RL at a rate sufficient to maintain the desired regulated dc output voltage level.

In the flyback operational mode, when switches 2 and 3 are closed, the diode 25' is reversed biased and the energy is stored in winding 8. There is no transfer of energy from winding 8 to winding 9 during this period. However, energy previously stored in the capacitor of filter 13, which has no inductor as previously explained, is delivered to the load RL at a rate sufficient to maintain the desired regulated dc output voltage level. When switches 2 and 3 are opened, diode 25' is forward biased. The energy stored in the winding 8 is transferred to winding 9, the latter also doubling as a choke as aforementioned. The current in winding 9 passes through the conducting diode 25' and divides into the two parallel branches formed by the capacitor of filter 13 and the load RL. The current in the capacitor branch recharges the capacitor to the desired regulated dc output voltage level, and the current in the load branch is used to supply the load RL at the desired regulated dc output voltage level.

Generally, the forward operational mode is used for high power applications and the flyback operational mode for low power applications. As is well known to those skilled in the art, the nominal level of the regulated output at terminals 14-15 depends inter alia on the parameters selected for the turns ratio of windings 8 and 9, the on/off duty cycle and the switching frequency.

According to the principles of the present invention, non-dissipative snubber circuit apparatus is provided in combination with a dual-switch transformer-coupled switching regulator. In FIG. 1, the preferred embodiment of the non-dissipative snubber circuit apparatus of the present invention is generally indicated by reference numeral 26. The circuit apparatus or snubber 26 has a pair of capacitors 27 and 28 and an inductor 29. The capacitors 27 and 28 each have a pair of electrodes designated 30 and 31. Electrode 31 of capacitor 27 is coupled to junction 10, and electrode 31 of capacitor 28 is coupled to junction 11. As such, electrodes 31 of capacitors 27 and 28 are coupled to the emitter and collector, respectively, of transistor switches 2 and 3, respectively. A diode switch 32 couples the inductor 29 between the electrodes 30 of capacitors 27 and 28. A second diode switch 33 couples electrode 30 of capacitor 27 to the junction 38 between the emitter of transistor switch 3 and the negative terminal 5 of supply 6. Another diode switch 34 couples electrode 30 of capacitor 28 to the junction 37 between the collector of the other transistor switch 2 and the positive terminal 4 of supply 6. As can readily be seen, snubber 26 is thus coupled across the switch terminals, to wit: collector and emitter electrodes, of each of the switches 2 and 3.

Preferably, an anti-ringing circuit, i.e. capacitor 35 and resistor 36, is provided across the inductor 29.

Figure 2A:
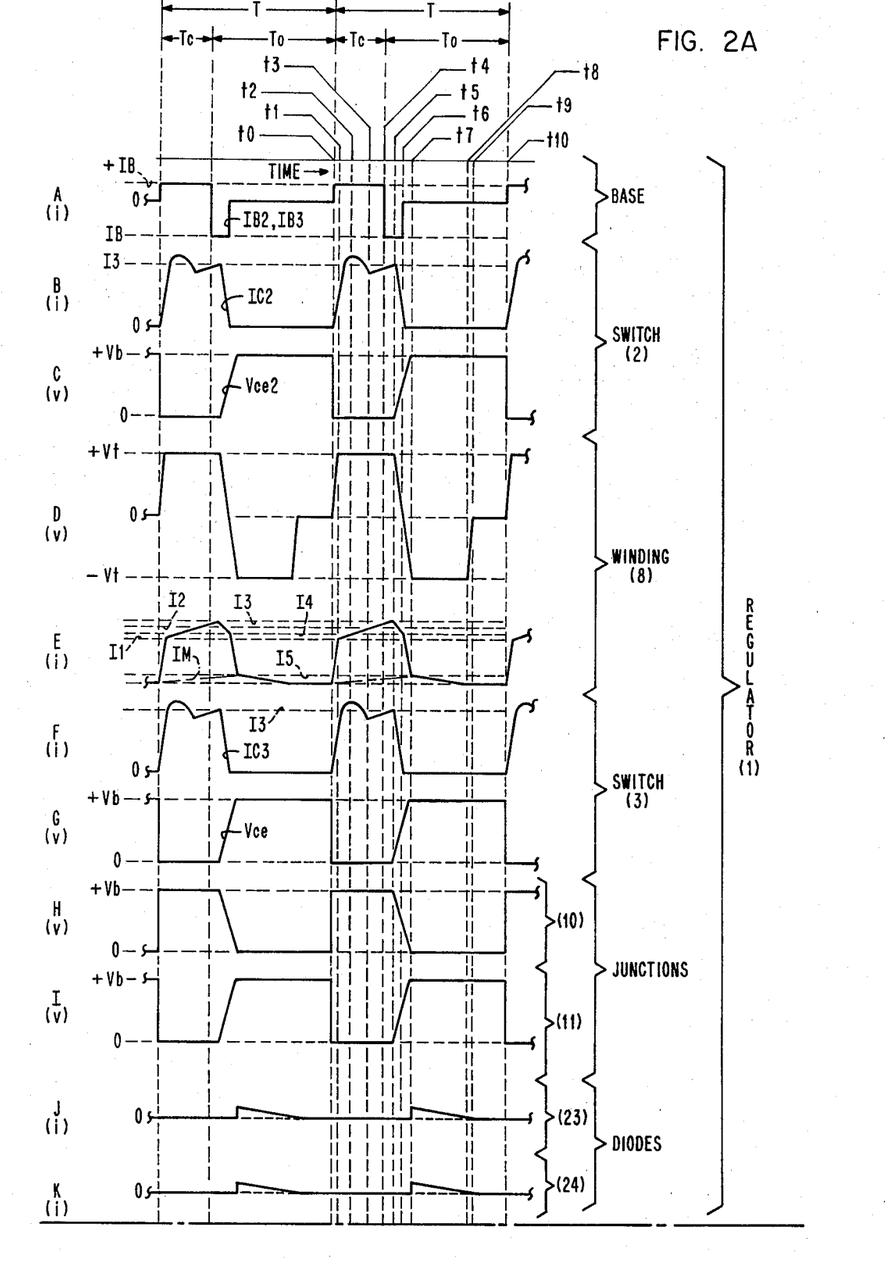
FIGS. 2A-2B are idealized waveform timing diagrams of certain voltage and current waveforms associated with the circuitry of FIG. 1.
Figure 2B:
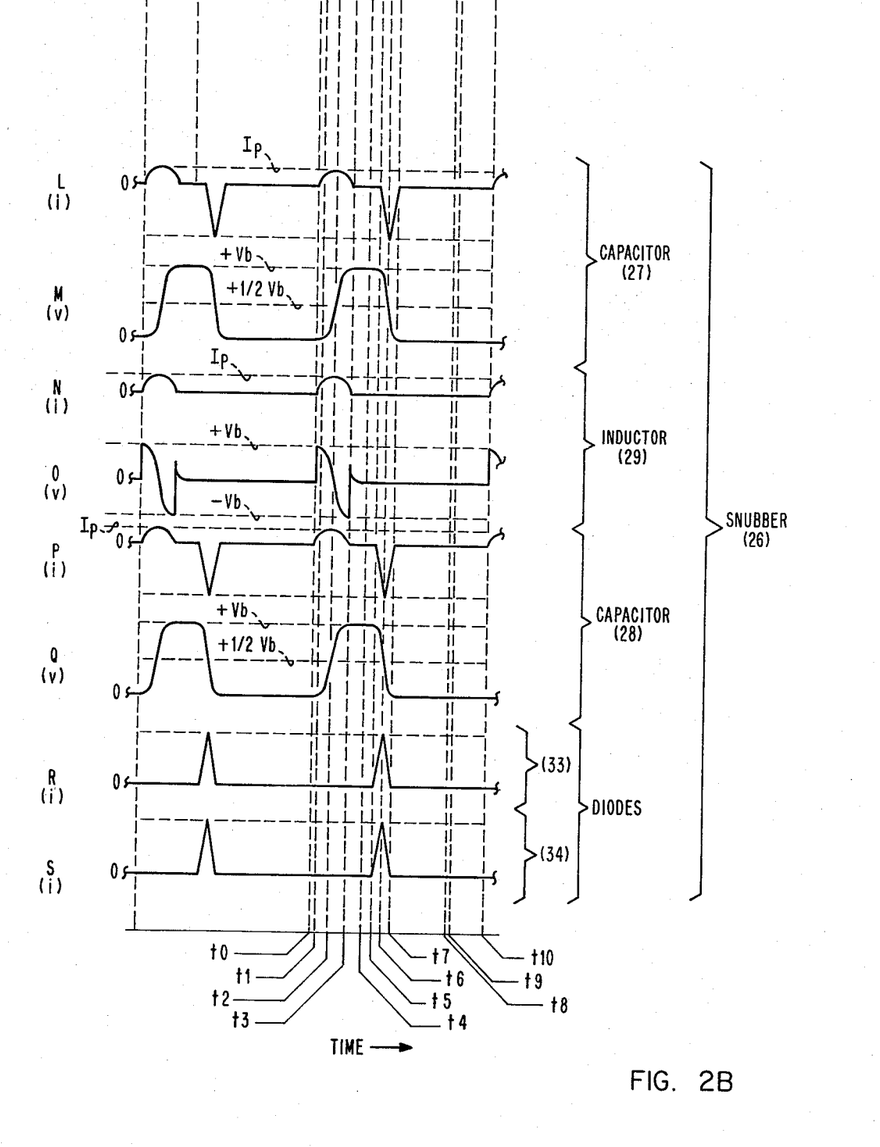

The operation of the circuitry of FIG. 1 in the preferred forward operational mode will next be described with reference to the waveforms A-S of FIGS. 2A-2B. By way of example and/or for purposes of explanation, it will be assumed that transistor switches 2 and 3 are ideal and simultaneously turn off. The reference characters v and i, which appear parenthetically alongside the ordinate axes associated with the waveforms A-S of FIGS. 2A-2B, are used to designate voltage and current waveform types, respectively, shown thereat. The waveforms A-S in FIGS. 2A-2B are plotted on a common time axis.

As aforementioned, switches 2 and 3 are adapted to be turned on and off, i.e. closed and opened, substantially in phase by the common control signal, not shown, at the output 17-20 of circuit 16. In the preferred embodiment, the control signal is a base drive signal appearing as an adjustable recurring pulse train which produces a switching frequency 1/T with a closed switch time (Tc) to open switch time (To) ratio Tc/To, cf. FIG. 2A. Moreover, in the preferred embodiment, the output signal at terminals 14-15 is regulated by varying the ratio Tc/To and maintaining a constant switching frequency 1/T. Hence, the switching period T is also a constant k, where:

$$T = Tc + To = k.$$

Waveforms A-K, FIG. 2A, pertain to the switching regulator 1. The base currents IB2 and IB3 of transistor switches 2 and 3, respectively, are shown by the same waveform A for sake of simplicity. Waveforms B and F are the collector currents IC2 and IC3, respectively, and waveforms C and G are the collector-to-emitter voltages Vce2 and Vce3, respectively, of respective switches 2 and 3. The voltage across winding 8 and the current associated with it are shown by waveforms D and E, respectively. Waveforms H and I are the voltages at junctions 10 and 11, respectively, taken with respect to ground. The currents associated with diodes 23 and 24 are illustrated by the waveforms J and K, respectively.

It is to be understood, as is apparent to those skilled in the art, the current waveform E is the algebraic composite of certain waveforms of which one is the waveform associated with the magnetizing current IM of transformer 8. The magnetizing current IM builds up during the magnetizing period and returns to the zero level during the demagnetizing period in accordance with well known principles. Preferably, the magnetizing and demagnetizing periods are substantially equal. For sake of clarity and purposes of explanation, the waveform of the magnetizing current IM is plotted commonly with the waveform E using the same set of axes as shown in FIG. 2A. Thus, the periods t0-t6 and t6-t8 are the magnetizing and demagnetizing periods, respectively, associated with the waveform of the magnetizing current IM. During the period t0-t7, the magnetizing current IM is shown in dash-dot outline form but because during the period t7-t8 it becomes superimposed with the waveform E it hence is shown in solid outline form thereat.

Waveforms L-S, FIG. 2B, pertain to the snubber 26. Waveforms L and P are the respective charge/discharge currents associated with capacitors 27 and 28, respectively, and waveforms M and Q are the corresponding voltages taken across capacitors 27 and 28, respectively. Likewise, waveform N is the current waveform associated with inductor 29 and waveform O is the corresponding voltage taken across inductor 29. The currents associated with diode switches 33 and 34 are shown by waveforms R and S, respectively.

It is assumed for purposes of explanation that at time t0 a turn-on period Tc commences. In response to the base drive signal, the base currents of switches 2 and 3 at the beginning of the turn-on period Tc rapidly rise to their respective staturated condition levels +IB from their just previous cutoff condition levels, i.e. zero level 0, cf. waveform A.

Moreover, at time t0, as switches 2 and 3 become conductive, the dc supply 6 begins to supply current. The current leaves terminal 4 of supply 6, passes through the closed switch 2, divides at junction 10 into two current branch parallel circuit paths next to be described which are rejoined at junction 11, and returns through closed switch 3 to terminal 5 of supply 6. One of the aforementioned two paths is through the winding 8 of the switching transformer 7 of regulator 1. The other path is through the series connected resonant elements 27, 29, 28 and forward biased diode switch 32 of snubber 26. As is apparent to those skilled in the art, diode switches 33 and 34, as well as switches 23 and 24, are reversed biased at time t0.

During the rise time period t0-t1, the current in winding 8 rises at a rate which is substantially dependent on the magnetic inductance of the transformer 7 and leakage inductance of the aforementioned choke winding, not shown, of filter 13, cf. waveform E. The current in winding 8 rises from its zero level 0 to the level I1, which is dependent upon the input voltage Vb divided by the product of the reflected impedance across winding 8 and the square of the turns ratio of the windings 8 and 9. The voltage across winding 8, i.e. waveform D, likewise rises rapidly during the period t0-t1 from the zero level 0 to the level +Vt.

During the time period t1-t4, i.e. the remainder of the turn-on time period Tc, the current in winding 8 continues to rise but at a slower rate which is dependent on the magnetic inductance of transformer 7 and the self-inductance of the aforementioned choke winding of filter 13, reaching a level I2 at time t4, at which time the base drive signal from control circuit 16 begins the turn off period To for switches 2 and 3. The corresponding voltage, waveform D, remains substantially at the +Vt level during the corresponding period t1-t4.

Concurrently, at time t0 as switches 2 and 3 become conductive, the current in the other one of the aforementioned two branch circuits starts to flow in a sinusoidal manner through the series resonant circuit 27-29 of snubber 26. Thus, as shown by waveform L, N, or P, FIG. 2B, the snubber current rises from its zero level 0 at time t0 to a peak Ip at time t2 during the first quarter period t0-t2 of the resonant cycle, and then falls back to its zero level 0 at time t3 during the second quarter period t2-t3 of the resonant cycle. As the snubber current passes through the capacitors 27 and 28 during the period t0-t3, the snubber capacitors 27 and 28 are charged thereby and rise from their respective zero voltage levels 0 at time t0 to their positive +Vb/2 levels at time t2, and continue to rise thereafter to their positive levels +Vb at time t3 as shown by the waveforms M and Q, respectively.

The same snubber current passes through the snubber inductor 29 during the period t0-t3 as shown by waveform N. Moreover, as shown by waveform O, the voltage across inductor 29 during the period t0-t3 is in quadrature relationship with the snubber current and inverse phase relationship with the respective voltages M and Q of the snubber capacitors 27 and 28. Thus, the voltage across inductor 29 rises substantially instantaneously from its zero level 0 to level +Vb at time t0 and begins to fall, crossing the zero level at time t2, and continues to fall till reaching the −Vb level at time t3.

During the period t0-t2, inductor 29 has a polarity of + to − from left to right as viewed facing FIG. 1 and the snubber current, which is charging the snubber capacitors 27 and 28, is substantially provided by supply 6. During the period t2-t3, the polarity reverses across the inductor 29 and inductor 29 provides the charging current for the snubber capacitors 27 and 28 continuing to charge them to their respective levels +Vb.

The second half of the resonant cycle is effectively blocked by the rectifier action of diode 32 at time t3. More specifically, as shown by waveform O, as the inductor voltage at time t3 attempts to rise to the positive level +Vb, it reverses its polarity thereby reverse biasing the diode 32 and preventing discharge of capacitors 27 and 28 through inductor 29 for the remainder of the period Tc, as well as the subsequent period To. Any ringing in the snubber current at time t3 is mitigated by the anti-ringing circuit 35-36.

Thus, during the period t0-t3, the current waveform B or F, which represents the current passing through each of the transistor switches 2 and 3, is the algebraic composite of the current waveform E associated with the current in winding 8 and the current waveform L, N, or O associated with the current in snubber 26. During the time period t3-t4, no current passes through snubber 26 and the switches 2 and 3 pass current only through the winding 8.

At time t4, the turn-off period To of the switching cycle begins in response to the change in the base drive signal, not shown, applied to transistor switches 2 and 3 from control circuit 16. As a result, the base currents, cf. waveform A, of switches 2 and 3 at time t4 rapidly fall to respective cutoff condition levels −IB and switches 2 and 3 begin to turn-off simultaneously. However, due to the effects of storage time of the transistor switches 2 and 3, the current through winding 8, as well as its constituent magnetizing current, continues to rise during the interval t4-t5, cf. corresponding waveforms B, E and F. During this same interval, the voltage across winding 8 remains at level +Vt, cf. waveform D.

At time t5, the storage time of the transistor switches 2 and 3 ends, and the current, waveforms B and F, through switches 2 and 3 drops rapidly from the level I3 at time t5 to the zero level 0 at time t6 during the period t5-t6. Correspondingly, the base currents, waveform A, return to the zeo level 0 at time t6, and switches 2 and 3 are fully turned off.

Moreover, during the period t5-t7, the collector-to-emitter voltages Vce2 and Vce3 of switches 2 and 3 rise from their saturated condition level 0 at time t5 to their cutoff condition level +Vb at time t7 as shown by waveforms C and G. As a result, during the corresponding period t5-t7, the voltage with respect to ground at junction 10 goes from level +Vb to level 0, and the voltage with respect to ground at junction 11 goes from level 0 to level +Vb, cf. waveforms H and I.

During the period t5-t6, the transistor switches 2 and 3 are still conducting and are in the process of being fully turned off by time t6. However, because the inductance of the filter choke 7 of filter circuit 13 tends to oppose the change in current, the curent in winding 8 does not drop as rapidly and consequently drops to the level I4 at time t6, cf. waveform E.

At time t6, switches 2 and 3 are fully turned off, and the current in winding 8 rapidly drops to the level I5 at time t7 as shown by waveform E. It should be noted that, during the period t5-t7, the voltage across winding 8 drops from level +Vt, passes through the zero level 0 at time t6, and reaches its negative level −Vt at time t7 as shown by waveform D.

At time t7, diode switches 23 and 24 become forward biased. During the next period t7-t8, the magnetizing current in the winding 8 is returned directly to the supply 6 and stored in the filter capacitor 6b through the closed switches 23 and 24, cf. waveform E, J or K. The voltage across winding 8 remains at the level −Vt during the period t7-t8.

At time t8, the magnetizing current IM reaches the zero level 0 and hence there is no conduction through winding 8. As a result, the voltage, waveform D, across it goes from its level −Vt at time t8 to the zero level 0 at time t9 and remains at the zero level 0 for the rest of the period To, i.e. until the beginning of the next switching period T at time t10.

Referring now to the snubber circuit 26, as aforementioned during the period t3-t5, as well as the remainder of the period t5-t10, diode 32 is reversed biased. At time t5, the voltage at junction 10 begins to drop from its +Vb level as shown by waveform H. The resultant voltage change at junction 10 in turn is transmitted through the capacitor 27 making its electrode 30, and hence the cathode of diode 33, more negative than the anode of diode 33 whereupon diode 33 becomes forward biased. A similar action occurs with respect to the diode 34 as the result of the voltage at junction 11 beginning to rise from its −Vb level at time t5 as shown by waveform I. Accordingly, the resultant voltage change at junction 11 in turn is transmitted through the capacitor 28 making its electrode 30 and hence the anode of diode 34 more positive than the cathode of diode 34 whereupon diode 34 becomes forward biased.

As a result, during the period t5-t6, capacitors 27 and 28 rapidly begin to discharge mainly through a series circuit path beginning arbitrarily for sake of description at electrode 31 of capacitor 27, and thence in sequence through winding 8, capacitor 28, diode 34, filter capacitor 6b, diode 33 and terminating at the other electrode 30 of capacitor 27. Discharge through switches 2 and 3 is substantially negligible during the corresponding period t5-t6 due to the switches 2 and 3 presenting a higher impedance to the inductive energy stored in the transformer 7 than the impedance of capacitors 27,28. When the switches 2 and 3 completely turn off at time t6, the capacitors 27 and 28 continue to absorb the inductive energy from the transformer 7 and discharge through the last mentioned circuit path. Hence, as shown by the current waveforms L and P, the capacitors 27 and 28 are completely discharged during the period t5-t7 and their corresponding voltage waveforms drop from their respective levels +Vb to zero levels 0, at which times diode 33 and 34 become reverse biased. At time t10, the next switching cycle begins.

Should the switches 2 and 3 not turn off at the same time, the regulator 1 and snubber 26 are not adversely effected. For example, if switch 3 should begin to turn-off before switch 2, diode 34 becomes forward biased and capacitor 28 begins to discharge toward the zero voltage level 0 through diode 34, the still fully on switch 2, and winding 8. The source current continues to flow through elements 2, 8 and 3. When switch 3 is fully turned off and if switch 2 is still fully on, the inductive current of winding 8 and the discharge current of capacitor 28 flow in the closed series loop of switch 2, winding 8, and diode 34.

When capacitor 28 is fully discharged, if the switch 2 has begun to turn off or when it subsequently begins to turn off, diode 34 becomes reverse biased and diodes 33 and 24 become forward biased. As result, capacitor 27 begins to discharge through a main circuit path which includes capacitor 27, winding 8, diode 24, filter capacitor 6b and diode 33. Concurrently, the inductive current of winding 8 passes through another loop, to wit: switch 2, winding 8 and diode 24.

When switch 2 fully turns off, capacitor 27 continues to discharge through aforementioned loop which includes elements 27, 8, 24, 6b and 33. Thereafter, when capacitor 27 becomes discharged, diode 33 is reverse biased and diode 23 forward biased. The magnetizing current then passes through the closed loop which includes winding 8, diode 24, filter capacitor 6b, and diode 23. Upon termination of the magnetizing current, diodes 23 and 24 are reverse biased and no current flows in the regulator 1 or snubber 26 until the next switching cycle.

As is readily apparent to those skilled in the art, the circuit operation is slightly modified for intermediate cases which fall between the two extreme cases, i.e. between the case where switches 2 and 3 turn off simultaneously and the case where one switch remains temporarily fully on after the other is turned fully off as, for example, the case just previously described. Thus, for sake of simplicity, the circuit operation description for such an intermediate case is omitted herein. In any case, the efficacy of the apparatus of FIG. 1 is not adversely effected.

Referring to FIG. 3, for example, current and voltage waveforms 40 and 41 thereof correspond to the current and voltage waveforms of switch 2 or 3, i.e. waveforms B and C of switch 2 or waveforms F and G of switch 3, during the transient period t5–t7 that the switches 2 and 3 are turning off simultaneously. For simultaneous cutoff, the current waveforms B and F are hence superimposed as shown by the waveform 40 of FIG. 3, and likewise the corresponding voltage waveforms C and G are also superimposed as shown by the waveform 41 of FIG. 3. Therefore, for simultaneous cutoff, the switching losses, i.e. the product of the current and voltage waveforms 40 and 41 as represented by the shaded area A1 formed under the intersection of the two curves 40 and 41 between time t5 and t6, are substantially equal. However, if one of the switches should be delayed from starting turn off for some time delay, e.g. td, after the other switch turns off at time t5, nevertheless the switching losses of the delayed switch are still substantially equal to the switching losses of the aforementioned other switch. Thus, in FIG. 3, waveforms 40' and 41' represent the current and voltage waveforms associated with the delayed switch during its transient period from time t5+td to time t7+td. The switching losses associated with the delayed switch during this period are represented by the shaded area A2 under the intersection of the two curves 40' and 41' between time t5+td and time t6+td and is substantially equal to the switching losses of the other switch as represented by the area A1 under its associated curves 40 and 41 between time t5 and t6.

The apparatus of circuit 1 is readily implemented in discreet, integrated, and hybrid circuitry. Typical parameters for the apparatus of FIG. 1 are given in the following table.

TABLE

Switching Frequency 1/T—30 KH.±10%
Bulk Voltage Vb—300 v.±30%
Capacitors 27, 28, each—0.01 uf.
Inductor 29—400 uh.
Transformer leakage inductance—100 uh.

In some applications, it may be desirable that one of the switches 2, 3 be favored to deliberately turn off after the other has turned off so that one switch will have greater switching losses than the other. In such a case, this may be accomplished, for example, by merely changing the value of an appropriate one of the capacitors 27 and 28. Also, one or both of the switches 2 and 3 can have one or more additional switches connected in parallel therewith for greater current switching capacity or the like as is well known to those skilled in the art. Also, while the invention has been described with particular NPN transistor types, it may also be implemented with PNP types with an appropriate adjustment of polarity. Other modifications to the apparatus of FIG. 1 include the use of other types of driver circuits in lieu of the feedback type circuit 16.

Thus, while the invention has been described with reference to a preferred embodiment thereof, it will be understood by those skilled in the art that various changes in form and details may be made without departing from the scope of the invention.

I claim:

1. In dual-switch transformer-coupled switching regulator circuit apparatus, said regulator circuit apparatus having:

a pair of first and second semiconductor switch means operable in phase, transformer means having an input winding coupled in series between said first and second switch means at predetermined first and second junctions, respectively, said series coupled pair of switch means and input winding being adapted for series connection between the positive and negative terminal means of a predetermined dc supply at predetermined third and fourth junctions, respectively, and third and fourth semiconductor switch means, said third switch means being coupled between said first junction and said fourth junction, and said fourth switch means being coupled between said second junction and said third junction, the combination therewith of non-dissipative snubber circuit apparatus, said snubber circuit apparatus comprising:

first and second capacitor means, each of said capacitor means having a pair of first and second electrodes, said second electrode of said first capacitor means being coupled to said first junction, and said second electrode of said second capacitor means being coupled to said second junction, inductor means, first diode means for coupling said inductor means between said first electrodes of said first and second capacitor means, second diode means for coupling said first electrode of said first capacitor means to said fourth junction, and third diode means for coupling said first electrode of said second capacitor means to said third junction.

2. The combination according to claim 1 wherein said snubber circuit apparatus further comprises an anti-ringing circuit connected across said inductor means.

3. The combination according to claim 1 wherein said regulator circuit apparatus further has control means for periodically opening and closing said first and second switch means.

4. The combination according to claim 3 wherein said regulator circuit apparatus is of the forward operational mode type.

5. In dual-switch transformer-coupled switching regulator circuit apparatus, said regulator circuit apparatus having:
a pair of first and second power transistors operable in phase, each of said transistors having base, emitter and collector electrodes, respectively,
a transformer having an input winding connected in series between the emitter electrode of said first transistor and the collector electrode of said second transistor, said collector electrode of said first transistor and said emitter electrode of said second transistor being connectable across the positive and negative terminals of a predetermined dc supply,
first and second diodes, said first diode being connected between said emitter electrodes of said first and second transistors, and said second diode being connected between the collector electrodes of said first and second transistors, and
driver means connected to said base electrodes for periodically turning said transistors on and off,
the combination therewith of non-dissipative snubber circuit apparatus, said snubber circuit apparatus comprising:
first and second capacitors, each of said capacitors having a pair of first and second electrodes, said second electrode of said first capacitor being connected to said emitter electrode of said first transistor, and said second electrode of said second capacitor being connected to said collector electrode of said second transistor,
an inductor,
a third diode connecting said inductor between said first electrodes of said first and second capacitors,
a fourth diode for connecting said first electrode of said first capacitor to said emitter electrode of said second transistor, and
a fifth diode for connecting said first electrode of said second capacitor to said collector electrode of said first transistor.

6. The combination according to claim 5 wherein said regulator circuit apparatus is of the forward operational mode type.

7. The combination according to claim 5 wherein said snubber circuit apparatus further comprises an anti-ringing circuit connected across said inductor.

8. The combination according to claim 5 wherein said first and second transistors are NPN types.

9. The combination according to claim 5 wherein said regulator circuit apparatus has a switching frequency of 30 KiloHertz ±10%.

10. The combination according to claim 5 wherein the capacitance of each of said capacitors is substantially 0.01 uf and the inductance of said inductor is substantially 400 mh.

* * * * *

UNITED STATES PATENT AND TRADEMARK OFFICE
CERTIFICATE OF CORRECTION

PATENT NO. : 4,403,269
DATED : September 6, 1983
INVENTOR(S) : L. B. Carroll

It is certified that error appears in the above-identified patent and that said Letters Patent are hereby corrected as shown below:

Column 12, line 34 change "mh" to -- microhenries (uh) --.

Signed and Sealed this

Sixteenth Day of October 1984

[SEAL]

Attest:

GERALD J. MOSSINGHOFF

Attesting Officer

Commissioner of Patents and Trademarks